US012811764B2

(12) United States Patent
Houdebine et al.

(10) Patent No.: US 12,811,764 B2
(45) Date of Patent: Nov. 24, 2026

(54) CONTACTLESS COMMUNICATION DEVICE BY ACTIVE LOAD MODULATION

(71) Applicant: STMicroelectronics International N.V., Geneva (CH)

(72) Inventors: Marc Houdebine, Crolles (FR); Bruno Leduc, Voiron (FR); Florent Sibille, Grenoble (FR)

(73) Assignee: STMicroelectronics International N.V., Geneva (CH)

( * ) Notice: Subject to any disclaimer, the term of this patent is extended or adjusted under 35 U.S.C. 154(b) by 51 days.

(21) Appl. No.: 18/886,470

(22) Filed: Sep. 16, 2024

(65) Prior Publication Data

US 2025/0105999 A1 Mar. 27, 2025

(30) Foreign Application Priority Data

Sep. 22, 2023 (FR) ...................................... 2310036

(51) Int. Cl.

*H04L 7/00* (2006.01)
*G06K 19/07* (2006.01)
*H04B 5/77* (2024.01)

(52) U.S. Cl.

CPC ........ *H04L 7/0033* (2013.01); *G06K 19/0723* (2013.01); *H04B 5/77* (2024.01)

(58) Field of Classification Search

CPC ..... H04L 7/0033; H04B 5/77; G06K 19/0723
See application file for complete search history.

(56) References Cited

U.S. PATENT DOCUMENTS

| | | | |
|---|---|---|---|
| 9,985,732 B2 | 5/2018 | Cordier | |
| 10,243,767 B2 | 3/2019 | Nakano et al. | |
| 10,334,421 B2 | 6/2019 | Cho et al. | |
| 10,721,604 B2 | 7/2020 | Hueber et al. | |
| 11,128,347 B2 | 9/2021 | Holweg et al. | |
| 12,424,739 B2 | 9/2025 | Jamin et al. | |
| 2010/0176659 A1 | 7/2010 | Aoyama et al. | |
| 2016/0241380 A1 | 8/2016 | Ghahramani et al. | |
| 2017/0163357 A1* | 6/2017 | Cordier | H04B 17/21 |
| 2018/0034510 A1 | 2/2018 | Hueber et al. | |
| 2018/0287669 A1 | 10/2018 | Nakano et al. | |
| 2019/0074914 A1* | 3/2019 | Hueber | H04B 5/24 |
| 2020/0356736 A1 | 11/2020 | Cordier et al. | |

FOREIGN PATENT DOCUMENTS

CN 112532551 A 3/2021

OTHER PUBLICATIONS

INPI Search Report and Written Opinion for priority application, FR Appl. No. 2310036, report dated Mar. 11, 2024, 12 pgs.

* cited by examiner

*Primary Examiner* — Janice N Tieu
(74) *Attorney, Agent, or Firm* — Crowe & Dunlevy LLC

(57) ABSTRACT

A device of contactless communication by active load modulation includes a receive circuit configured to receive as an input a reception signal originating from a magnetic field intended to be received by an antenna. A transmit circuit has an output coupled to the antenna with a modulation signal in phase with the reception signal intended to be delivered thereon. A circuit compensates for a delay of the modulation signal due to the transmit circuit and to the amplitude of the reception signal. The compensation circuit determines a phase-shift value to be applied to an input signal of the transmit circuit to compensate for the delay.

11 Claims, 4 Drawing Sheets

CONTACTLESS COMMUNICATION DEVICE BY ACTIVE LOAD MODULATION

PRIORITY CLAIM

This application claims the priority benefit of French Application for Patent No. 2310036, filed on Sep. 22, 2023, the content of which is hereby incorporated by reference in its entirety to the maximum extent allowable by law.

TECHNICAL FIELD

The present disclosure generally concerns the field of wireless communications between a reader and a device of contactless communication by active load modulation, in particular between a reader and such a device operating in card emulation (CE) mode. The present disclose may, in particular, concern the field of contactless communications implemented in Near Field Communication (NFC) technology.

BACKGROUND

Near-field communication (NFC) is a wireless connectivity technology allowing a communication over a short distance, for example in the order of some ten centimeters, between electronic devices, such as for example a contactless chip card and a reader, or a device (for example a cell phone or a connected object) operating in card emulation (CE) mode and a reader.

A contactless communication device is a device capable of exchanging information via an antenna with another contactless device, for example a reader, according to a contactless communication protocol.

An NFC device, which is a contactless device, is a device compatible with the NFC technology. The NFC technology is an open technological platform standardized in the ISO/IEC 18092 and ISO/IEC 21481 standard but incorporates many already-existing standards such as for example the type-A and type-B protocols defined in the ISO-14443 standard, which may be communication protocols usable in the NFC technology.

A CE device may be used to exchange information with another contactless device, for example a contactless reader, by using a contactless communication protocol usable in the NFC technology.

During a transmission of information between a reader and a CE device or a NFC card, the reader generates an electromagnetic field via its antenna which is generally, according to the standards conventionally used, a sine wave having a frequency equal to 13.56 MHz. Each of the NFC devices (reader and CE device) transmits data by using a modulation scheme, for example an amplitude shift keying or ASK.

Two operating modes are possible: a passive mode, which corresponds to the mode used by a NFC card, or an active mode, which generally corresponds to the mode used by a CE device.

In the passive mode, also called passive load modulation (PLM), only the reader generates the electromagnetic field and the card is then passive. The card antenna modulates the electromagnetic field generated by the reader via a modification of a load connected across the card antenna, which modifies the output impedance of the reader antenna due to the magnetic coupling between the two antennas. This results in a change in the amplitudes and/or the phases of the voltages and currents present at the antennas of the reader and of the card. The information is thus transmitted from the card to the reader by load modulation to the antenna currents of the reader.

In the active mode, also called active load modulation (ALM), the reader and the CE device both generate an electromagnetic field. This operating mode is used when the CE device is provided with a specific power source, for example a battery.

Generally, a CE device comprises an antenna smaller than that of a NFC card, and this is the reason why an active load modulation is generally used in such a device.

During an active load modulation, the electromagnetic fields emitted by the reader and the CE device are in phase with each other so that the detection sensitivity of the device is not decreased. The CE device may, in particular, comprise a transmit circuit having its output coupled to the antenna, as well as a phase-locked loop (PLL), particularly used to compensate for the propagation delay in the transmit circuit.

The components of the transmit circuit are however subject to Process, Voltage, Temperature (PVT) variations may generate a delay or an advance of the signal delivered at the output of the transmission signal, resulting in a phase shift between the electromagnetic field emitted by the reader and that emitted by the CE device. The amplitude variations of the electromagnetic field emitted by the reader and/or of the coupling between the antennas of the reader and of the CE device may also contribute to this phase-shift, given that the delay of transmission of the signal through the transmit circuit also varies according to the amplitude of the received electromagnetic field and thus to the coupling between the antennas of the reader and of the CE device.

There exists a need to provide a solution enabling to address the problems encountered with existing solutions.

SUMMARY

In an embodiment which overcomes all or part of the disadvantages of known solutions, a device of contactless communication by active load modulation comprises at least: a receive circuit configured to receive as an input a reception signal originating from an electromagnetic field intended to be received by an antenna; a transmit circuit comprising an output coupled to the antenna and having a modulation signal in phase with the reception signal intended to be delivered thereon; and a circuit for compensating for a delay of the modulation signal due to the transmit circuit and to the amplitude of the reception signal, configured to determine a phase-shift value to be applied to an input signal of the transmit circuit to compensate for the delay.

According to a specific embodiment, the device further comprises a phase-locked loop configured to receive as an input a first clock signal delivered at the output of the receive circuit and the phase-shift value, and to deliver on a first output the input signal of the transmit circuit.

According to a specific embodiment, the compensation circuit comprises at least a circuit for measuring a phase difference between the input signal of the transmit circuit and a delayed signal corresponding to the input signal of the transmit circuit delayed by said delay.

According to a specific embodiment, the measurement circuit comprises at least: a counting trigger circuit comprising a first input configured to receive at least the input signal of the transmit circuit and a second input configured to receive at least the delayed signal, and configured to deliver as an output a counting trigger signal having a first value for a time period equal to the delay and a second value, different from the first value, outside of this time period; a counter comprising a clock input coupled to an output of the counting trigger circuit, and a data input coupled to a second output of the phase-locked loop on which a periodic signal having a frequency equal to a multiple of that of the input signal of the transmit circuit is intended to be delivered; and a computing circuit configured to determine the phase-shift value according to a value of a counting signal intended to be delivered by the counter.

According to a specific embodiment, the transmit circuit comprises a controlled switch having an output corresponding to the output of the transmit circuit.

According to a specific embodiment, the transmit circuit includes a control input configured to receive a signal controlling the transmission or not of a signal on the output of the transmit circuit, and comprises a delay circuit provided with an input coupled to the input of the transmit circuit, with an output coupled to the second input of the counting trigger circuit and which is configured to apply a delay having a value equal to that due to the transmit circuit.

According to a specific embodiment, the receive circuit comprises at least: a variable gain amplifier configured to receive as an input the reception signal; and a converter of a sinusoidal signal into a square signal, comprising an input coupled to an output of the variable gain amplifier, and an output corresponding to an output of the receive circuit.

According to a specific embodiment, there is provided a method of contactless communication between a reader and a device, comprising at least the implementation of the following steps: detecting a magnetic field by the device; when a magnetic field is detected by the device, transmitting a first clock signal by the receive circuit of the device receiving as an input a reception signal originating from the magnetic field; measuring, by the compensation circuit of the device, and compensating the delay of the modulation signal due to the transmit circuit and to the amplitude of the reception signal in a signal applied at the input of the transmit circuit of the device, the compensated delay depending on the amplitude of the reception signal and on a target amplitude of the modulation signal intended to be delivered at the output of the transmit circuit; and application, by the transmit circuit of the device, of the modulation signal to the antenna.

According to a specific embodiment, the transmission of the first clock signal by the receive circuit of the device is followed by a starting and by a locking of the phase-locked loop on the first clock signal.

According to a specific embodiment, the method further comprises, between the transmission of the first clock signal and the application of the phase-shift value: measuring the reception power; and preprogramming a power of components of the transmit circuit according to the measured reception power.

According to a specific embodiment, the method further comprises, before the measurement and the compensation of the delay, applying a control signal to a control input of the controlled switch of the transmit circuit or to the control input of the transmit circuit such that no signal is delivered at the output of the transmit circuit.

According to a specific embodiment, the method further comprises, after measuring and compensating the delay, applying the control signal to the control input of the controlled switch of the transmit circuit or to the control input of the transmit circuit in such a way that the modulation signal is delivered on the output of the transmit circuit.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail. In particular, the forming of the different elements and circuits (variable gain amplifier, converter of a sinusoidal signal into a square signal, phase-locked loop, lookup table, analog-to-digital converter, computing circuit, delay circuit, flip-flops, counters, etc.) of the device is not described in detail. It will be within the abilities of those skilled in the art to implement in detailed fashion the different functions of the device based on the functional description given herein.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

Unless specified otherwise, the expressions "about", "approximately", "substantially", and "in the order of" signify plus or minus 10%, preferably of plus or minus 5%.

Figure 1:
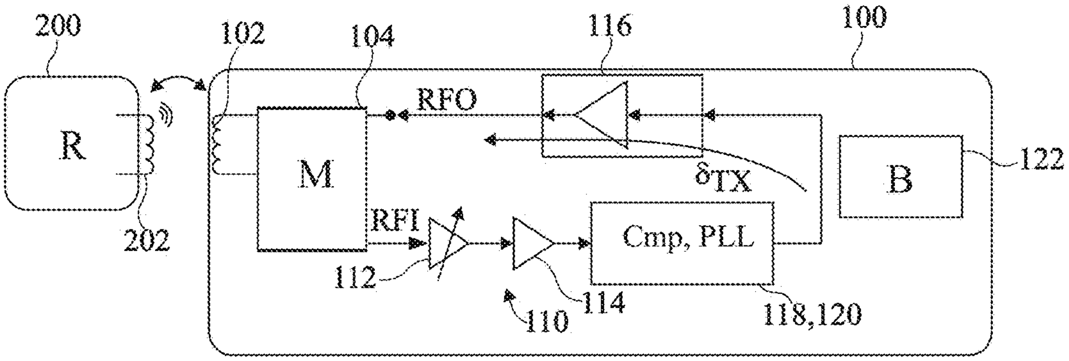
FIG. 1 schematically shows an example of a device of contactless communication by active load modulation communicating with a contactless reader.

An example of a device 100 of contactless communication by active load modulation according to a specific embodiment is described hereafter in relation with FIG. 1.

Device 100 is of NFC type, that is, is configured to use a communication protocol compatible with the NFC technology. In the described example, device 100 corresponds to a device in card emulation mode (CE). In FIG. 1, device 100 is shown during a communication with an NFC-type contactless reader (R) 200.

In the described example, device 100 comprises an antenna 102 intended to exchange data with an antenna 202 of reader 200 via the emission of electromagnetic fields by these antennas 102, 202 and the magnetic coupling of these antennas 102, 202.

In the specific configuration shown in FIG. 1, device 100 further comprises a matching circuit (M) 104 coupled between antenna 102 and the other elements of device 100. Circuit 104 may, in particular, be used to match the impedance of antenna 102 to interface the input and output signals of antenna 102.

Device 100 further comprises a receive circuit 110 configured to receive as an input a reception signal originating from an electromagnetic field intended to be received by antenna 102 and to deliver as an output a first clock signal. In FIG. 1, the reception signal is referred to as "RFI" and corresponds to a sinusoidal signal. The frequency of signal RFI is, for example, equal to 13.56 MHz.

In a specific configuration corresponding to that shown in FIG. 1, receive circuit 110 comprises at least: a variable gain amplifier, or VGA, 112 configured to receive as an input signal RFI; and a converter 114 of a sinusoidal signal into a square signal, comprising an input coupled to an output of VGA 112, and an output having the first clock signal intended to be delivered thereon.

In this specific configuration, the signal transmitted at the output of converter 114 corresponds to a square signal having an amplitude greater than that of signal RFI, that is, corresponds to the transformation of signal RFI into a square signal amplified with a gain higher than 1.

As a variant, receive circuit 110 may comprise additional elements and/or elements different from those of the example of FIG. 1.

Device 100 further comprises a transmit circuit 116 comprising an output coupled to circuit 104 and which is intended to deliver on this output a modulation signal referred to as "RFO" to antenna 102. This signal RFO includes information intended to be transmitted by device 100 to reader 200. Signal RFO is intended to be in phase with signal RFI.

Device 100 further comprises a compensation circuit (Cmp) 118 for compensating a delay $\delta_{TX}$ of signal RFO due to transmit circuit 116, including the delay due to the PVT variations of the components of transmit circuit 116, and to the amplitude of signal RFI. When device 100 is communicating with reader 200, the amplitude of signal RFI may be directly proportional to that of the electromagnetic field received by antenna 102 and thus to the coupling between antennas 102, 202. Compensation circuit 118 is configured to determine, at each starting of device 100, a phase-shift value to be applied to an input signal of transmit circuit 116 to compensate for delay $\delta_{TX}$.

In the specific configuration shown in FIG. 1, device 100 further comprises a phase-locked loop, or PLL, 120 intended to synchronize signal RFO with the received signal RFI, and thus compensate for the delays due to the processing of the signals in the different circuits and elements of device 100. This PLL 120 is configured to receive as an input the first clock signal delivered by receive circuit 110 as well as the phase-shift value determined by compensation circuit 118, and to deliver on a first output the input signal of transmit circuit 116. Thus, PLL 120 is here configured to take into account the phase-shift value determined by compensation circuit 118 so that the signal delivered at the output of PLL 120 to transmit circuit 116 comprises no further phase shift, or delay, due to transmit circuit 116 and to the amplitude of signal RFI.

In the diagram of FIG. 1, only some of the elements of device 100 are shown. Device 100 comprises, in addition to those shown in FIG. 1, other circuits and elements not described herein, such as for example circuits for modulating and demodulating the data received and transmitted by device 100.

In the configuration shown in FIG. 1, device 100 further comprises a battery (B) 122 intended to electrically power different circuits and components of device 100.

Figure 2:
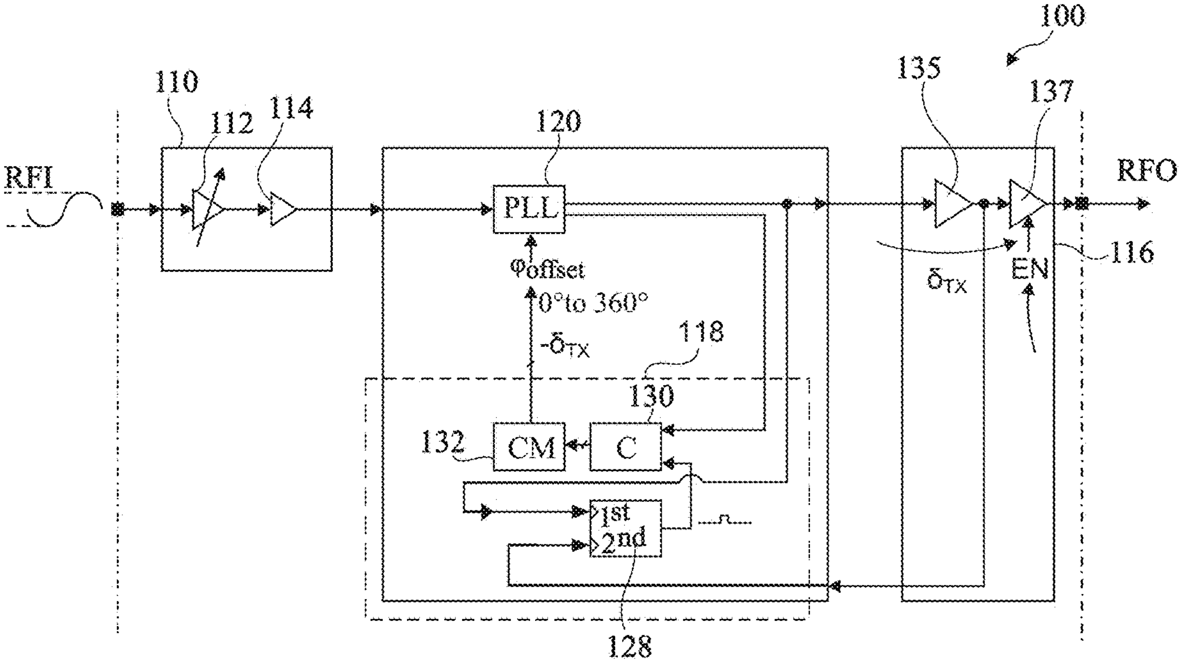
FIG. 2 schematically shows details of a first example of a device of contactless communication by active load modulation.

A first more detailed example of device 100 is described hereafter in relation with FIG. 2. In FIG. 2, only part of the components and circuits of device 100 are shown and described hereafter. For example, as compared with FIG. 1, the antenna 102 and the circuit 104 of device 100 are not shown in FIG. 2.

In the described example, compensation circuit 118 comprises a circuit for measuring a phase difference between the input signal of transmit circuit 116, obtained at the output of PLL 120, and a delayed signal corresponding to the input signal of transmit circuit 116 delayed by delay $\delta_{TX}$.

In a specific configuration corresponding to that shown in FIG. 2, this measurement circuit comprises: a counting trigger circuit 128 comprising a first input having the input signal of transmit circuit 116 intended to be applied thereto, a second input having the delayed signal (input signal of transmit circuit 116 delayed by delay $\delta_{TX}$) intended to be applied thereto, and configured to deliver as an output a counting trigger signal having a first value for a time period equal to delay $\delta_{TX}$ and a second value, different from the first value, outside of this time period; a counter (C) 130 comprising a clock input coupled to an output of circuit 128, and a data input coupled to a second output of PLL 120 on which a periodic signal having a frequency equal to a multiple of that of the input signal of transmit circuit 116 is intended to be delivered; and a computing circuit (CM) 132 configured to determine the phase-shift value to be applied according to a value of a counting signal intended to be delivered by counter 130, the output of counter 130 being coupled to an input of computing circuit 132.

The value of the frequency of the periodic signal delivered on the second output of PLL 120 may depend on the components of PLL 120, and for example on the operating frequency of an oscillator present in PLL 120. For example, the frequency of the reception signal and the frequency of the input signal of transmit circuit 116 may be equal to 13.56 MHz, and the frequency of the periodic signal delivered on the second output of PLL 120 may be equal to approximately 868 MHz (64*13.56 MHz).

The measurement circuit is thus configured to measure the phase difference between the input signal of the transmit circuit and the delayed signal, which is representative of delay $\delta_{TX}$, via a counting having its result representative of this phase difference and thus of this delay $\delta_{TX}$ which depends, in particular, on the PVT variations of the components of transmit circuit 116 and on the amplitude of reception signal RFI.

In the example of FIG. 2, the different elements and components of transmit circuit 116 generating delay $\delta_{TX}$ are symbolized by a single component designated with reference 135. In this first example of device 100, transmit circuit 116 further comprises a controlled switch 137 having an output corresponding to the output of transmit circuit 116. The output of component 135 is coupled to the input of controlled switch 137 as well as to the second input of circuit 128. According to the value of the control signal, called "EN" in FIG. 2, applied to controlled switch 137, signal RFO is delivered or not at the output of transmit circuit 116.

During the operation of device 100, first, switch 137 is controlled in such a way that it is in an off state so that signal RFO is not delivered at the output of transmit circuit 116, that is, no modulation signal is delivered by transmit circuit 116. The signal obtained at the output of component 135 is only injected into the measurement circuit so that delay $\delta_{TX}$ is computed or measured. After the computed phase-shift value, referred to as "$\varphi_{offset}$" in FIG. 2, is applied by PLL 120 to the input signal of transmit circuit 116, switch 137 may be controlled in such a way that it is in an on state and that modulation signal RFO is transmitted from the output of transmit circuit 116. The modulation signal RFO obtained at the output of transmit circuit 116 is effectively phase-shifted to compensate for delay $\delta_{TX}$ (compensation symbolized by indication "$-\delta_{TX}$" at the output of circuit 132).

As a variant, the function fulfilled by the measurement circuit may be obtained by using circuits and components different from those described hereabove. Further, one or a plurality of different components of the controlled switch 137 described hereabove may be used to fulfill a similar function, that is, the transmission or not of signal RFO from the output of transmit circuit 116.

The features and variants previously described in relation with the device 100 of FIG. 1 may apply to the device 100 according to this first example shown in FIG. 2.

Figure 3:
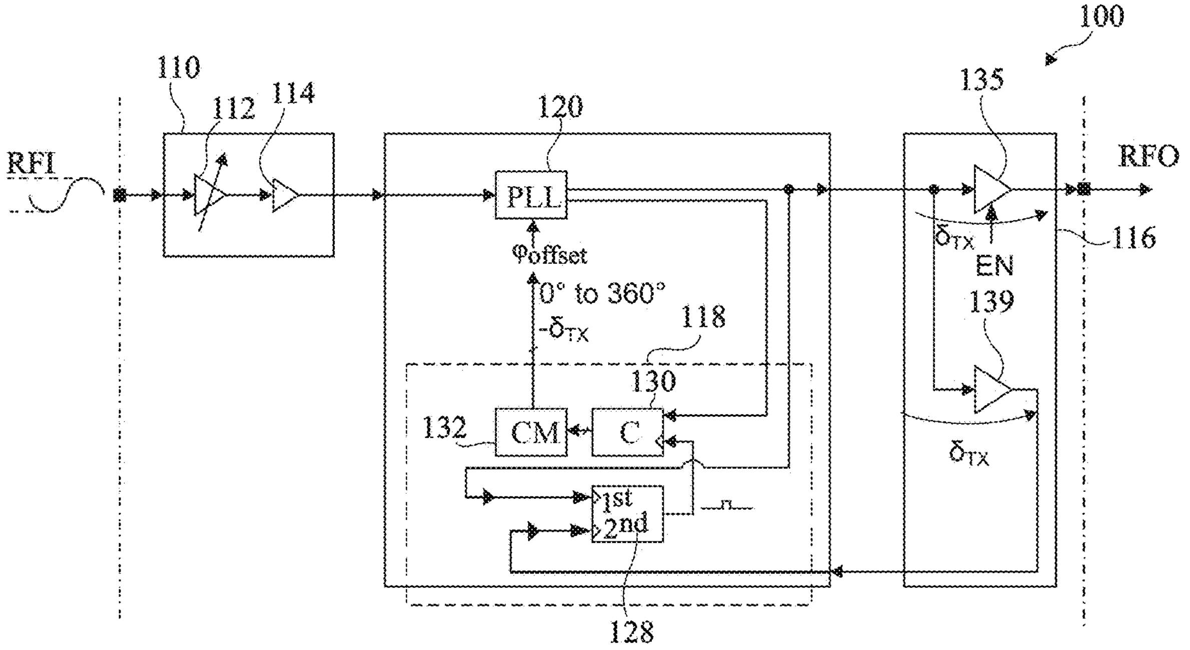
FIG. 3 schematically shows details of a second example of a device of contactless communication by active load modulation.

A second example of device 100 is described hereafter in relation with FIG. 3. In FIG. 3, only part of the components and circuits of device 100 are shown and described hereafter. For example, as compared with FIG. 1, the antenna 102 and the circuit 104 of device 100 are not shown in FIG. 3.

In the transmit circuit 116 of device 100 according to the second example, controlled switch 137 is not present, the interruption or not of the output of transmit circuit 116 being directly controlled by control signal "EN" applied to component 135.

In this second example, transmit circuit 116 comprises a delay circuit 139 replicating the delay $\delta_{TX}$ due to the different elements and components of transmit circuit 116 and symbolized by component 135. The input of delay circuit 139 is coupled to the input of transmit circuit 116, and thus to the first output of PLL 120, and the output of delay circuit 139 is coupled to the second input of circuit 128.

During the operation of device 100, first, component 135 is controlled (via signal "EN") such that signal RFO is not delivered at the output of transmit circuit 116, that is, no modulation signal is delivered by transmit circuit 116. The signal obtained at the output of delay circuit 139 is injected into the measurement circuit so that delay $\delta_{TX}$ is computed. After the computed phase-shift value is applied by PLL 120 to the input signal of transmit circuit 116, component 135 may be controlled in such a way that the RFO modulation signal is transmitted to the output of transmit circuit 116. The RFO modulation signal obtained at the output of transmit circuit 116 is effectively phase-shifted to compensate for delay $\delta_{TX}$ (compensation symbolized by the indication "$-\delta_{TX}$" at the output of circuit 132).

Further, one or a plurality of different components of the delay circuit 139 described hereabove may be used to fulfill a similar function, that is, duplicating the transmission delay of transmit circuit 116.

The features and variants previously described in relation with the device 100 of FIG. 1 or of FIG. 2 may apply to the device 100 according to this second example shown in FIG. 3.

Figure 4:
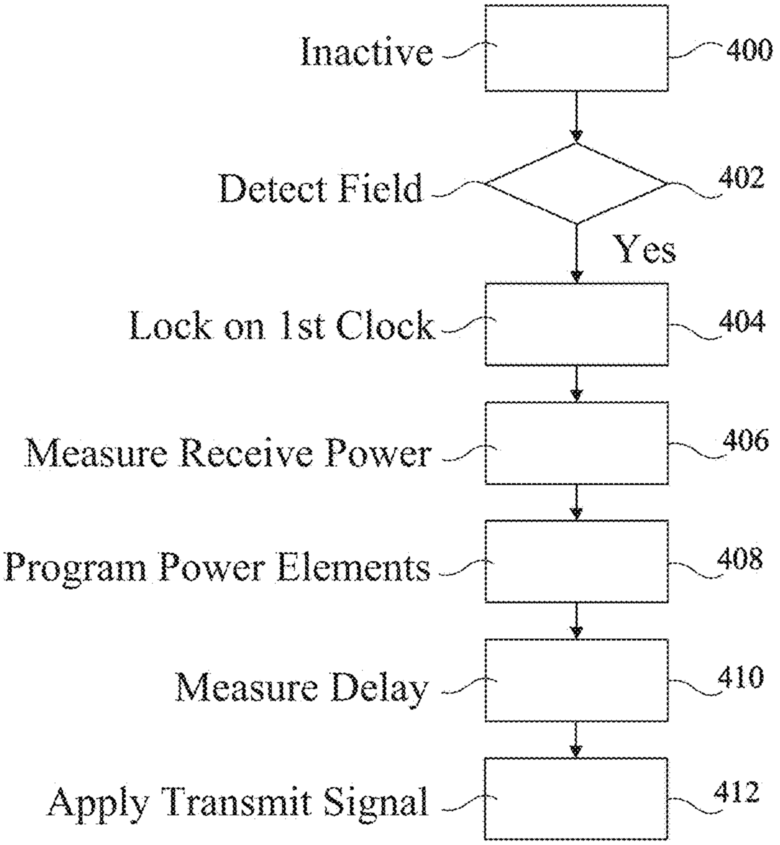
FIG. 4 schematically shows steps of an example of a method of communication of a device of contactless communication by active load modulation with a reader.

FIG. 4 schematically shows the steps of an example of a method of communication of device 100 with reader 200.

Device 100 may be in an inactive state (step 400).

During a step 402, device 100 verifies whether a magnetic field corresponding to that emitted by a reader is detected.

In the absence of such a magnetic field, device 100 is held in the inactive state (return to step 400).

In the presence of such a magnetic field, the first clock signal is delivered by receive circuit 110 which receives as an input the reception signal originating from the magnetic field received by antenna 102. PLL 120 starts and then locks on this first clock signal (step 404). This locking of the PLL enables to ensure a fixed and known frequency of the oscillator, for example equal to 64*13.56 MHz, and thus enables to have an accurate time base for the measurement.

The receive power is measured to determine the coupling coefficient between reader 200 and device 100 (step 406). This measurement of the receive power is, for example, performed with an element not shown in FIGS. 1 to 3 and capable of corresponding to an analog-to-digital converter (ADC) having its output coupled to a digital circuit configured to analyze the amplitude of the received signal.

According to the amplitude measured at the previous step, the power of elements 135 and 139 may be preprogrammed to apply to modulation signal RFO the adequate power to answer reader 200 (step 408).

The measurement of delay $\delta_{TX}$ is then performed to remove the phase shift corresponding to the set point of PLL 120 (step 410). Thus, the delay of the modulation signal due to transmit circuit 116 and to the amplitude of the reception signal is compensated in the signal applied at the input of transmit circuit 116.

A signal RFO, in phase with the field of reader 200, is then obtained at the output of transmit circuit 116 and applied to antenna 102, allowing the communication between device 100 and reader 200 (step 412).

Figure 5:
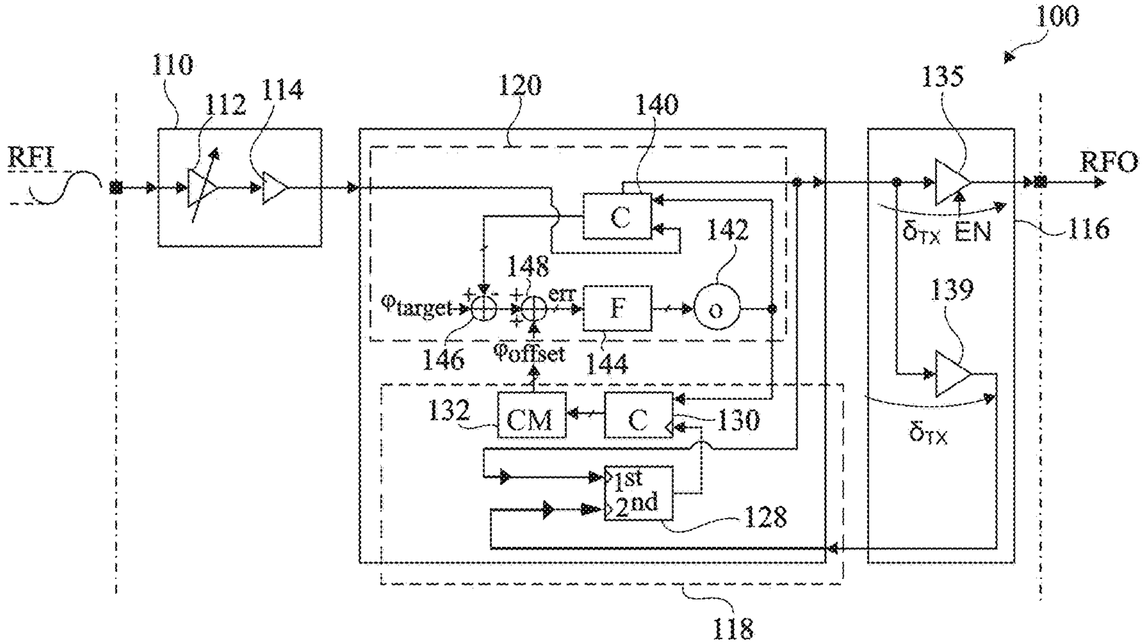
FIG. 5 schematically shows details of a second example of a device of contactless communication by active load modulation.

The second example of device 100 is described hereafter in relation with FIG. 5. In FIG. 5, only part of the components and circuits of device 100 are shown and described hereafter. As compared with the device 100 previously described in relation with FIG. 3, an example of PLL 120 is detailed in FIG. 5.

In the example of FIG. 5, PLL 120 comprises a counter (C) 140, an oscillator (O) 142, a filter (F) 144, a subtractor 146, and an adder 148.

In this example, counter 140 comprises a clock input coupled to the output of receive circuit 110, a data input coupled to an output of oscillator 142 which corresponds to the second output of the PLL 120 previously described in relation with FIG. 3, and an output coupled to a negative input of subtractor 146 and having a counting value delivered thereon. Counter 140 also delivers, on another output, the input signal of transmit circuit 116.

A target phase value, referred to as "$\varphi_{target}$", is applied to a positive input of subtractor 146. This value $\varphi_{target}$ may correspond to a predetermined value, for example stored in a register of device 100, and which, for example, corresponds to the expected phase shift, considering the delay due to the different elements and circuits of device 100 without taking into account the delay due to the PVT variations of transmit circuit 116 and to the amplitude of the reception signal.

The output of subtractor 146 is coupled to a first input of adder 148 and phase-shift value $\varphi_{offset}$ is applied to a second input of adder 148.

The output of adder 148 is coupled to the input of filter 144, and the output of filter 144 is coupled to the input of oscillator 142.

According to an example, oscillator 142 may be of Digital Controlled Oscillator (DCO) type.

According to an example, the frequency of the periodic signal delivered by oscillator 142 may be equal to approximately 868 MHz (64*13.56 MHz), and those of the input signal of transmit circuit 116 delivered by counter 140 and of the reception signal and of the first clock signal may be equal to 13.56 MHz.

As a variant, PLL 120 may comprise circuits and/or components different from those described hereabove and shown in FIG. 5.

Figure 6:
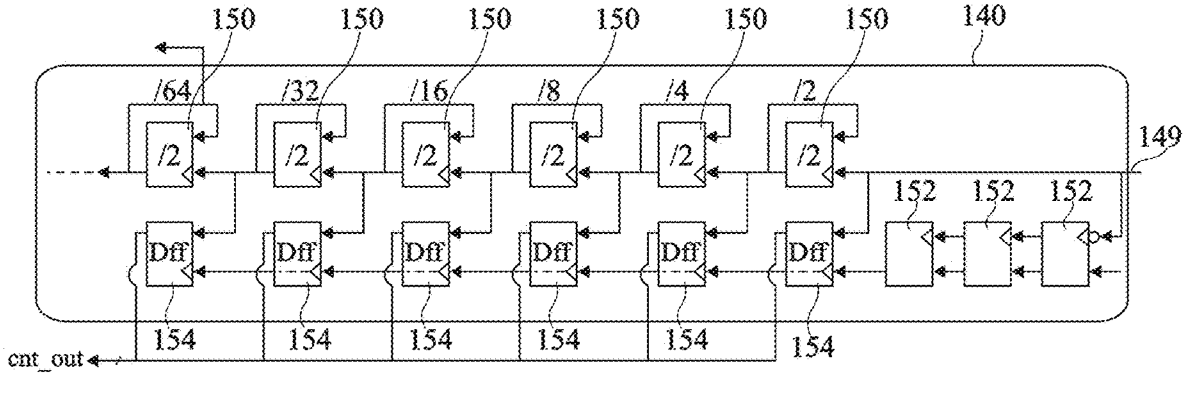
FIG. 6 schematically shows an example of a counter of a phase-locked loop of a device of contactless communication by active load modulation.

An example embodiment of counter 140 is shown in FIG. 6.

In this example, counter 140 comprises an input 149 having the output signal of oscillator 142 applied thereto. Counter 140 comprises, in the example of FIG. 6, also a plurality of frequency dividers 150 series-coupled with one another in such a way that the output of each of these dividers is coupled to the clock input of the next divider. In this example, the output signal of oscillator 142 is applied to the clock input of first divider 150. Further, the output signal of one of dividers 150 corresponds to the input signal of transmit circuit 116. In this example, frequency dividers 150 are configured to divide by a factor 2 the frequency of the signal received on their input. Thus, in the described example, given that the ratio of the frequency of the periodic signal delivered by oscillator 142 to that of the input signal of transmit circuit 116 is equal to 64, the input signal of transmit circuit 116 is obtained at the output of the $6^{th}$ divider 150 ($2^6$=64). Further, in a specific configuration, each of the dividers 150 configured to divide by a factor 2 the frequency of the received signal on their input may be formed by a D flip-flop having its output looped back on its input via an inverter.

In this example, counter 140 further comprises a plurality of flip-flops 152 (3 D flip-flops in FIG. 6) series-coupled with one another in such a way that the output of each of flip-flops 152 is coupled to the data input of the next flip-flop 152. The output signal of oscillator 142 is here applied to the clock input of each of flip-flops 152. The first clock signal delivered by receive circuit 110 is applied to the data input of first flip-flop 152. These flip-flops 152 enable to avoid the occurrence of a metastability in counter 140.

In the described example, counter 140 also comprises other D flip-flops 154 series-coupled with one another in such a way that the clock inputs of these flip-flops 154 are coupled to one another. The first one of these flip-flops 154 receives on its clock input the output signal of the last one of flip-flops 152, and on its data input the output signal of oscillator 142. The other flip-flops 154 receive on their data input the output signals of dividers 150. The output signals of flip-flops 154 form together the counting signal (referred to as "cnt_out" in FIG. 6) which is coded in binary form in this example (the output signal of each of flip-flops 154 corresponding to a bit of this counting signal).

As a variant, counter 140 may be formed with elements and/or components different from those described hereabove and shown in FIG. 6.

Figure 7:
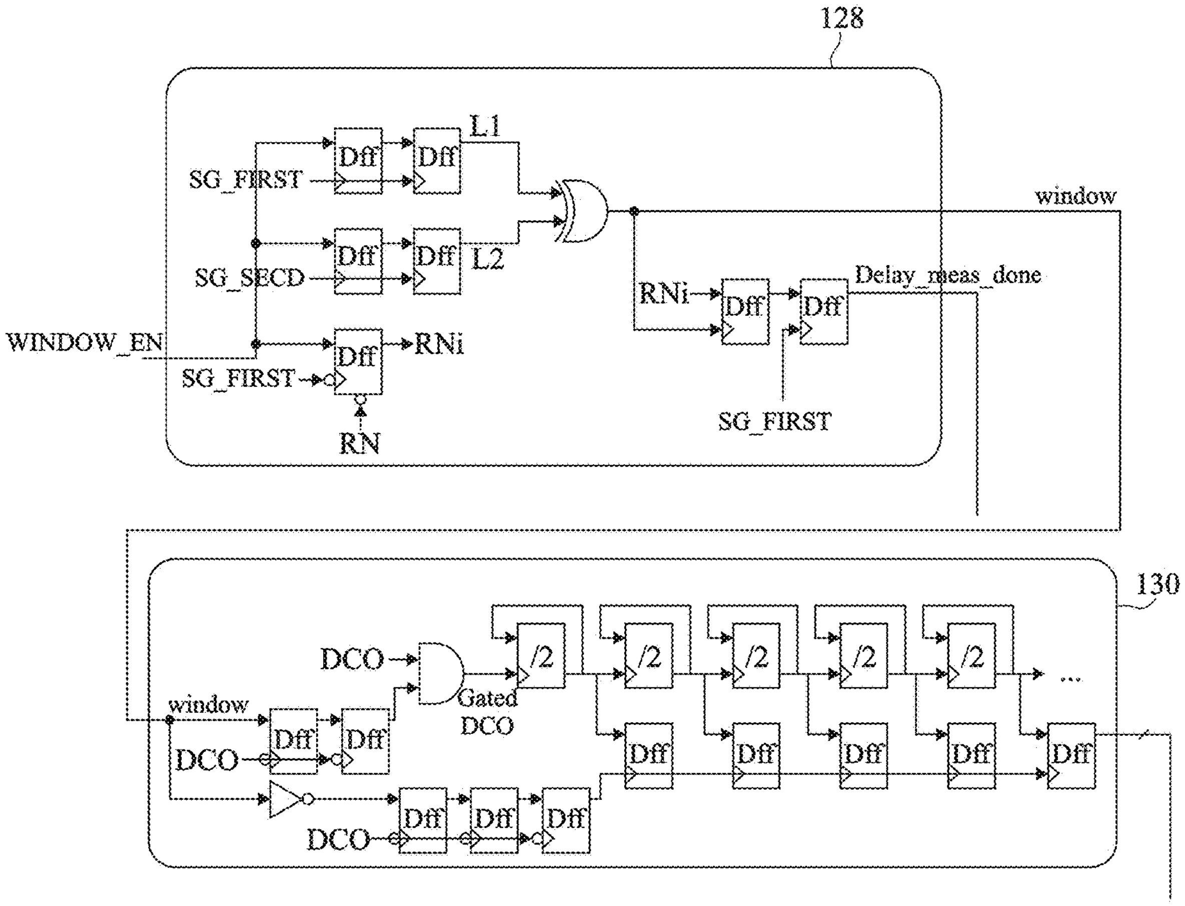
FIG. 7 schematically shows an example of a counting trigger circuit and of a counter forming part of a device of contactless communication by active load modulation.

An example embodiment of counting trigger circuit 128 and of counter 130 is shown in FIG. 7. A timing diagram of the signals used in these circuits 128, 130, during a determination of a phase-shift value to be applied to the input signal of transmit circuit 116 to compensate for delay $\delta_{TX}$ is also shown in FIG. 8.

Figure 8:
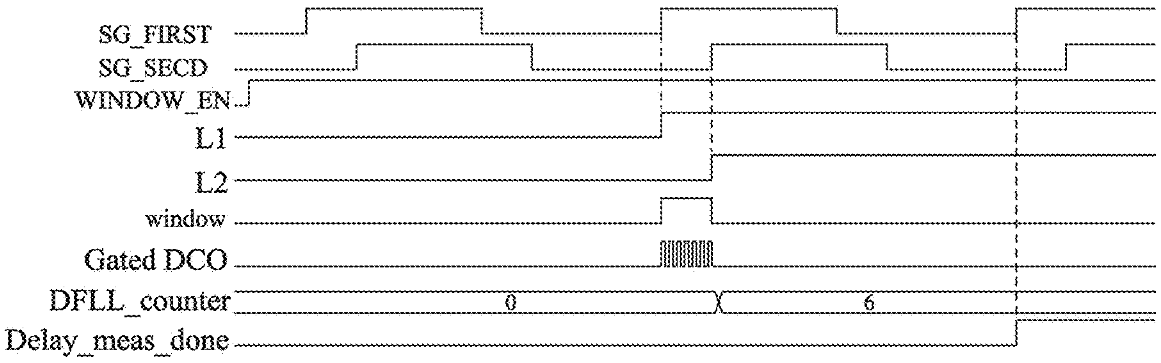
FIG. 8 shows a timing diagram of examples of signals used in the circuits of FIG. 7.

In FIGS. 7 and 8, the following captions are used:

SG_FIRST: output signal of PLL 120, corresponding to the input signal of transmit circuit 116;

SG_SECD: output signal of transmit circuit 116, that is, including delay $\delta_{TX}$;

Window: counting trigger signal;

WINDOW_EN: signal for enabling the counting trigger circuit 128;

DCO: output signal of oscillator 142;

Gated DCO: Output signal of the gate and of the counter 130 shown in FIG. 7;

DFLL_counter: output signal of counter 130;

Delay_meas_done: signal delivered at the output of circuit 128 and indicating that the counting is complete and can be read at the output of circuit 130;

RN: signal resetting the D flip-flops when its value is at state 0, and letting the D flip-flops operate at each clock edge when its value is at state 1; and Rni: end-of-measurement indication signal.

In FIG. 7, blocks "Dff" correspond to D flip-flops, and blocks "/2" correspond to frequency dividers applying a division factor equal to 2.

The details of operation of the circuits 128 and 130 shown in FIG. 7 are not described herein, those skilled in the art will understand the operation of these circuits based on the components and wirings shown in FIG. 7 as well as based on the timing diagram of FIG. 8. Further, the signals of the timing diagram of FIG. 8 are shown schematically and out of scale with respect to one another, for the amplitudes as well as for the time periods of the different portions of these signals.

In the different examples, the provided device 100 may enable, for each use of the device to communicate with a reader, to compensate for the delay due to the PVT variations of the transmit circuit 116 of device 100 and to the amplitude of the reception signal received at the input of receive circuit 110. The different elements of device 100 may, in particular, allow: a synchronization of a clock signal (first clock signal in the above description), for example corresponding to a square signal, with no delay variation with a reception signal, for example corresponding to a sinusoidal signal, having an amplitude that may vary; a measurement of the delay between the input and output signals of transmit circuit 116; and a use of a PLL as an accurate time base to automatically perform a measurement and a correction of the delay occurring in the device.

In all the examples, the provided device may facilitate contactless communications between the device and a reader, authorizing the device to have a small antenna and/or a low power and/or a large distance between the device and the reader.

In all the examples, the compensation of the delay by the device may be performed without using an external device to measure the delays, and/or without having to deliver as an output one or a plurality of measurement signals, since the compensation can be performed within the device.

In all the examples, the device may comprise counters to automatically perform delay measurements.

In all the examples, due to the achieved delay compensation, the phase of the signal transmitted by the device remains stable even when the amplitude of the magnetic field received by the device varies, which results in a resulting magnetic field where the amplitude levels are clearly distinct and different from each other.

In all the examples, it is possible for the measurement of delay $\delta_{TX}$ to be carried on even after transmit circuit 116 transmits signal RFO, which enables to refine the measurement of this delay $\delta_{TX}$.

In the above description, device 100 corresponds to a device of contactless communication by active load modulation which is, during a communication with a reader, in card emulation mode. Device 100 may be provided with functionalities other than those described hereabove. Device 100 may, for example, correspond to a cell phone or a connected object such as a watch.

Various embodiments and variants have been described. Those skilled in the art will understand that certain features of these various embodiments and variants may be combined, and other variants will occur to those skilled in the art.

Finally, the practical implementation of the described embodiments and variants is within the abilities of those skilled in the art based on the functional indications given hereabove.

The invention claimed is:

1. A device of contactless communication by active load modulation, comprising:

a receive circuit having an input configured to receive a reception signal originating from a magnetic field intended to be received by an antenna;

a transmit circuit having an output coupled to the antenna and configured to generate a modulation signal in phase with the reception signal intended to be delivered to the output; and a compensation circuit configured to compensate for a delay of the modulation signal due to the transmit circuit and an amplitude of the reception signal, wherein the compensation circuit determines a phase-shift value to be applied to an input signal of the transmit circuit to compensate for the delay.

2. The device according to claim 1, further comprising a phase-locked loop configured to receive as an input a first clock signal delivered at the output of the receive circuit and the phase-shift value, and to deliver on a first output the input signal of the transmit circuit.

3. The device according to claim 2, wherein the compensation circuit comprises a circuit configured to measure a phase difference between the input signal of the transmit circuit and a delayed signal corresponding to the input signal of the transmit circuit delayed by said delay, and wherein the circuit configured to measure the phase difference comprises:

a counting trigger circuit comprising a first input configured to receive at least the input signal of the transmit circuit and second input configured to receive at least the delayed signal, wherein the counting trigger circuit is configured to output a counting trigger signal having a first value for a time period equal to the delay and a second value, different from the first value, outside of said time period;

a counter comprising a clock input coupled to an output of the counting trigger circuit, and a data input coupled to a second output of the phase-locked loop providing a periodic signal having a frequency equal to a multiple of a frequency of the input signal of the transmit circuit; and a computing circuit configured to determine the phase-shift value according to a value of a counting signal delivered by the counter.

4. The device according to claim 3, wherein the transmit circuit includes a control input configured to receive a signal controlling selective transmission of a signal on the output of the transmit circuit, and comprises a delay circuit having an input coupled to the input of the transmit circuit and an output coupled to the second input of the counting trigger circuit, wherein said delay circuit is configured to apply a delay having a value equal to that due to the transmit circuit.

5. The device according to claim 1, wherein the compensation circuit comprises a phase difference circuit configured to measure a phase difference between the input signal of the transmit circuit and a delayed signal corresponding to the input signal of the transmit circuit delayed by said delay.

6. The device according to claim 5, wherein the transmit circuit comprises a controlled switch having an output corresponding to the output of the transmit circuit.

7. The device according to claim 1, wherein the receive circuit comprises:

a variable gain amplifier having an input configured to receive the reception signal; and a converter circuit configured to convert a sinusoidal signal into a square signal, wherein the converter circuit comprises an input coupled to an output of the variable gain amplifier, and an output corresponding to an output of the receive circuit.

8. A method of contactless communication between a reader and a device, the method comprising:

detecting a magnetic field by the device;

when the magnetic field is detected by the device, transmitting a first clock signal by a receive circuit of the device receiving as an input a reception signal originating from the magnetic field;

measuring, by a compensation circuit of the device, and compensating a delay of a modulation signal due to a transmit circuit and to an amplitude of the reception signal in a signal applied at an input of the transmit circuit of the device, the compensated delay depending on the amplitude of the reception signal;

applying, by the transmit circuit of the device, the modulation signal to an antenna; and after transmitting the first clock signal, starting and locking a phase-locked loop on the first clock signal, and outputting from the phase-locked loop the input signal of the transmit circuit.

9. The method according to claim 8, further comprising, after the transmission of the first clock signal:

measuring reception power; and preprogramming a power of components of the transmit circuit according to the measured reception power.

10. A method of contactless communication between a reader and a device, the method comprising:

detecting a magnetic field by the device;

when the magnetic field is detected by the device, transmitting a first clock signal by a receive circuit of the device receiving as an input a reception signal originating from the magnetic field;

measuring, by a compensation circuit of the device, and compensating a delay of a modulation signal due to a transmit circuit and to an amplitude of the reception signal in a signal applied at an input of the transmit circuit of the device, the compensated delay depending on the amplitude of the reception signal;

applying, by the transmit circuit of the device, the modulation signal to an antenna; and wherein the compensation circuit comprises a circuit for measuring a phase difference between the input signal of the transmit circuit and a delayed signal corresponding to the input signal of the transmit circuit delayed by said delay, and wherein the transmit circuit comprises a controlled switch having an output corresponding to the output of the transmit circuit, the method further comprising, before measuring and compensating the delay, applying a control signal to one of a control input of the controlled switch of the transmit circuit or a control input of the transmit circuit in such a way that no signal is delivered at the output of the transmit circuit.

11. The method according to claim 10, further comprising, after measuring and compensating the delay, applying the control signal to one of the control input of the controlled switch of the transmit circuit or the control input of the transmit circuit in such a way that the modulation signal is delivered on the output of the transmit circuit.

* * * * *